(12) United States Patent
Sakamaki et al.

(10) Patent No.: US 12,007,567 B2
(45) Date of Patent: Jun. 11, 2024

(54) DISPLAY DEVICE

(71) Applicant: CANON KABUSHIKI KAISHA, Tokyo (JP)

(72) Inventors: Takuya Sakamaki, Kanagawa (JP); Tatsuya Hanayama, Tokyo (JP); Atsushi Sugawara, Kanagawa (JP); Kaori Tomura, Tokyo (JP); Yosuke Fukai, Kanagawa (JP); Yusuke Toriumi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/775,926

(22) Filed: May 11, 2022

(65) Prior Publication Data
US 2022/0390753 A1 Dec. 8, 2022

Related U.S. Application Data

(63) Continuation of application No. PCT/JP2020/029990, filed on Aug. 5, 2020.

(30) Foreign Application Priority Data

Nov. 13, 2019 (JP) ................................. 2019-205442
Nov. 13, 2019 (JP) ................................. 2019-205493

(51) Int. Cl.
| | | |
|---|---|---|
| *G02B 27/01* | (2006.01) | |
| *G06F 3/01* | (2006.01) | |
| *H04N 23/695* | (2023.01) | |

(52) U.S. Cl.
CPC ..... *G02B 27/0172* (2013.01); *G02B 27/0179* (2013.01); *G06F 3/012* (2013.01);
(Continued)

(58) Field of Classification Search
None
See application file for complete search history.

(56) References Cited

U.S. PATENT DOCUMENTS 9,426,371 B2   8/2016 Takeuchi
2010/0302347 A1* 12/2010 Shikata ................ H04N 23/698
                                                348/E7.001
(Continued)

FOREIGN PATENT DOCUMENTS

| JP | 2014-056017 A | 3/2014 |
|---|---|---|
| JP | 2015-060071 A | 3/2015 |

(Continued)

OTHER PUBLICATIONS

International Search Report dated Nov. 2, 2020, in International Patent Application No. PCT/JP2020/029990.

*Primary Examiner* — Jwalant Amin
(74) *Attorney, Agent, or Firm* — Venable LLP

(57) ABSTRACT

A display device configured to be used in a state of being fixed to a head of a user, includes: a camera; a display configured to display a part of an image captured by the camera as a display range; an orientation detection sensor configured to detect an orientation of the display device; a line-of-sight detection sensor configured to detect a line-of-sight of the user to the display; and a processor configured not to control a position of the display range based on the line-of-sight detected by the line-of-sight detection sensor in a case where a change amount of the orientation detected by the orientation detection sensor is smaller than a predetermined amount, and to control the position of the display range based on the line-of-sight in a case where the change amount of the orientation is larger than the predetermined amount.

12 Claims, 12 Drawing Sheets

(52) U.S. Cl.
  CPC ........... *G06F 3/013* (2013.01); *H04N 23/695* (2023.01); *G02B 2027/0138* (2013.01); *G02B 2027/014* (2013.01); *G02B 2027/0187* (2013.01)

(56) References Cited

U.S. PATENT DOCUMENTS

| | | | |
|---|---|---|---|
| 2014/0225812 A1 | 8/2014 | Hosoya | |
| 2014/0368426 A1* | 12/2014 | Umehara | ................ G06T 15/20 |
| | | | 345/156 |
| 2015/0103194 A1 | 4/2015 | Takeuchi | |
| 2020/0035208 A1* | 1/2020 | Kudo | ....................... G09G 5/00 |

FOREIGN PATENT DOCUMENTS

| | | | | |
|---|---|---|---|---|
| JP | 2015-075697 A | | 4/2015 | |
| JP | 2015-087523 A | | 5/2015 | |
| JP | 2015087523 A | * | 5/2015 | ......... G02B 27/0093 |
| JP | 2015-149552 A | | 8/2015 | |
| JP | 2016-105555 A | | 6/2016 | |
| JP | 2019-139673 A | | 8/2019 | |
| JP | 2019145059 A | * | 8/2019 | |
| WO | 2021/095307 A1 | | 5/2021 | |

* cited by examiner

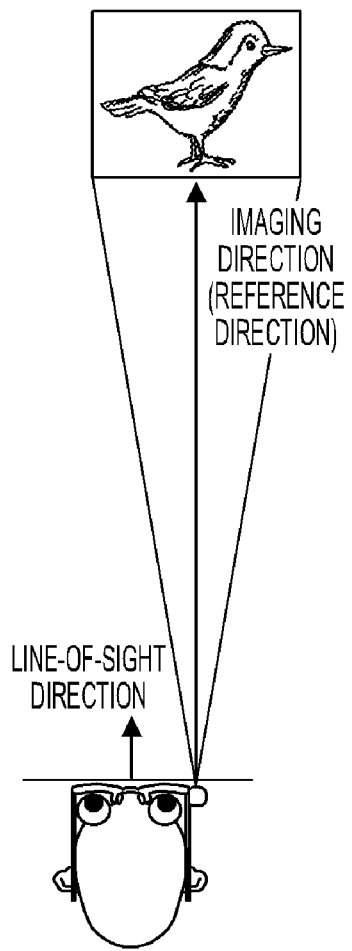
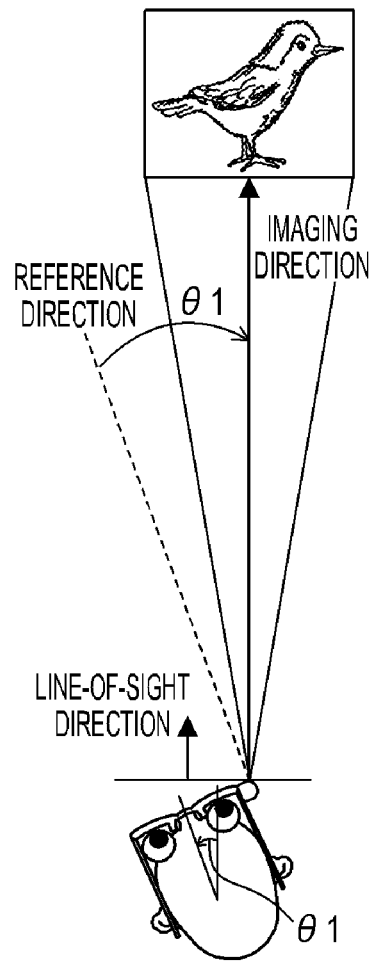

DISPLAY DEVICE

CROSS-REFERENCE TO RELATED APPLICATIONS

This application is a Continuation of International Patent Application No. PCT/JP2020/029990, filed Aug. 5, 2020, which claims the benefit of Japanese Patent Application No. 2019-205442, filed Nov. 13, 2019, and Japanese Patent Application No. 2019-205493, filed Nov. 13, 2019, which are hereby incorporated by reference herein in their entirety.

BACKGROUND OF THE INVENTION

Field of the Invention

The present invention relates to a display device, and more particularly to an electronic binocular telescope.

Background Art

An electronic binocular telescope is a display device that includes a camera and displays which are disposed in front of the eyes of a user when the electronic binocular telescope is in use, and displays images captured by the camera on the displays in real-time. By looking at the images (telescopic images) displayed on the displays of the electronic binocular telescope, the user can observe a distant area as if looking through binoculars. Some electronic binocular telescopes are configured to be detachably mounted (wearable) on the head, such as a case of a head mounted display.

PTL 1 discloses a technique to detect a line-of-sight position of the user, and control an image-capturing range so that the line-of-sight position comes to the center position of the image-capturing range.

When the electronic binocular telescope is used, it is preferable to provide a field-of-view to the user in a same way as observing with the naked eye. In the case of observing with the naked eye, the field-of-view expands in the direction of the line-of-sight, regardless the movement of the head and the orientation (direction) of the face. However, in the case of the commonly used electronic binocular telescope, the field-of-view (object range (angle-of-view) of the images displayed on the displays; observation range) changes in accordance with the movement of the head, regardless the direction of the line-of-sight. Since the observation range changes by an unintentional movement of the head, the user has a sense of discomfort and has difficultly to focus on the observation. Particularly when a highly magnified image is displayed, the observation range changes considerably by a slight movement of the head.

In a case of using the technique disclosed in PTL 1, in which the image-capturing range becomes the observation range, the line-of-sight position becomes the center position of the image-capturing range, hence the observation range changes depending on the line-of-sight, even if the user wants to look out over a desired observation range.

In this way, in the prior arts, the observation range may be unintentionally changed, and the user may experience a sensation completely different from observation with the naked eye (sense of discomfort). This problem occurs in both a case of a wearable electronic binocular telescope and a case of an electronic binocular telescope that is not wearable.

The present invention provides a technique with which an unintentional change of the observation range can be minimized, and the user can experience a sensation close to the observation with the naked eye (sensation with no or minimal sense of discomfort).

CITATION LIST

Patent Literature

PTL 1 Japanese Patent Application Laid-open No. 2015-149552

SUMMARY OF THE INVENTION

The present invention in its first aspect provides a display device configured to be used in a state of being fixed to a head of a user, including: a camera; a display configured to display a part of an image captured by the camera as a display range; an orientation detection sensor configured to detect an orientation of the display device; a line-of-sight detection sensor configured to detect a line-of-sight of the user to the display; and a processor configured not to control a position of the display range based on the line-of-sight detected by the line-of-sight detection sensor in a case where a change amount of the orientation detected by the orientation detection sensor is smaller than a predetermined amount, and to control the position of the display range based on the line-of-sight in a case where the change amount of the orientation is larger than the predetermined amount.

The present invention in its second aspect provides a control method of a display device including a camera and a display configured to display a part of an image captured by the camera as a display range, the display device being configured to be used in a state of being fixed to a head of a user, the control method including: an orientation detection step of detecting an orientation of the display device; a line-of-sight detection step of detecting a line-of-sight of the user to the display; and a control step of not controlling a position of the display range based on the line-of-sight detected in the line-of-sight detection step in a case where a change amount of the orientation detected in the orientation detection step is smaller than a predetermined amount, and controlling the position of the display range based on the line-of-sight in a case where the change amount of the orientation is larger than the predetermined amount.

The present invention in its third aspect provides a non-transitory computer readable storage medium that stores a program, wherein the program causes a computer to execute a control method of a display device including a camera and a display configured to display a part of an image captured by the camera as a display range, the display device being configured to be used in a state of being fixed to a head of a user, the control method including: an orientation detection step of detecting an orientation of the display device; a line-of-sight detection step of detecting a line-of-sight of the user to the display; and a control step of not controlling a position of the display range based on the line-of-sight detected in the line-of-sight detection step in a case where a change amount of the orientation detected in the orientation detection step is smaller than a predetermined amount, and controlling the position of the display range based on the line-of-sight in a case where the change amount of the orientation is larger than the predetermined amount.

Further features of the present invention will become apparent from the following description of exemplary embodiments with reference to the attached drawings.

BRIEF DESCRIPTION OF THE DRAWINGS

FIGS. 8A to 8D are schematic diagrams according to the states of a display device and a user according to Embodiments 3 and 4;

DESCRIPTION OF THE EMBODIMENTS

Embodiment 1

Embodiment 1 of the present invention will be described. Here an example of applying the present invention to an electronic binocular telescope that can be detachably mounted (wearable) on the head such as a head mounted display, will be described, but a display device to which the present invention is applicable is not limited to the wearable electronic binocular telescope. For example, the present invention may be applied to an electronic binocular telescope that is not wearable, or the present invention may be applied to other wearable devices that can be detachably mounted on the head (e.g. head mounted displays of VR goggles, AR glasses, MR glasses, smart glasses, or the like). The present invention may also be applied to a display device covering both eyes (e.g. VR goggles) such that the user cannot view the surroundings with the naked eye (the user can view the image with both eyes). Furthermore, the present invention may be applied to a display device that covers only one eye, so that the user can view an image using the one eye and view the surroundings with the naked eye using the other eye. According to the present invention, good observation becomes possible even in a state where the user cannot view the surroundings with the naked eye, hence the present invention is suitable for a display device that covers both eyes (details described later).

Figure 2A:
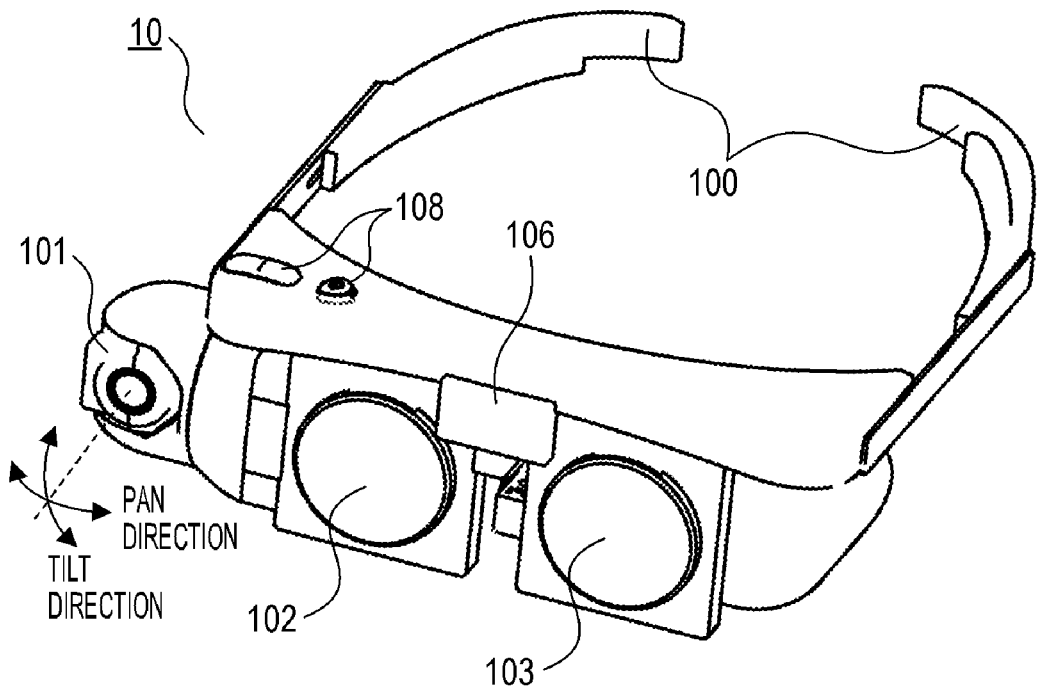
FIGS. 2A and 2B are external views of an electronic binocular telescope according to Embodiments 1 to 4.
Figure 2B:
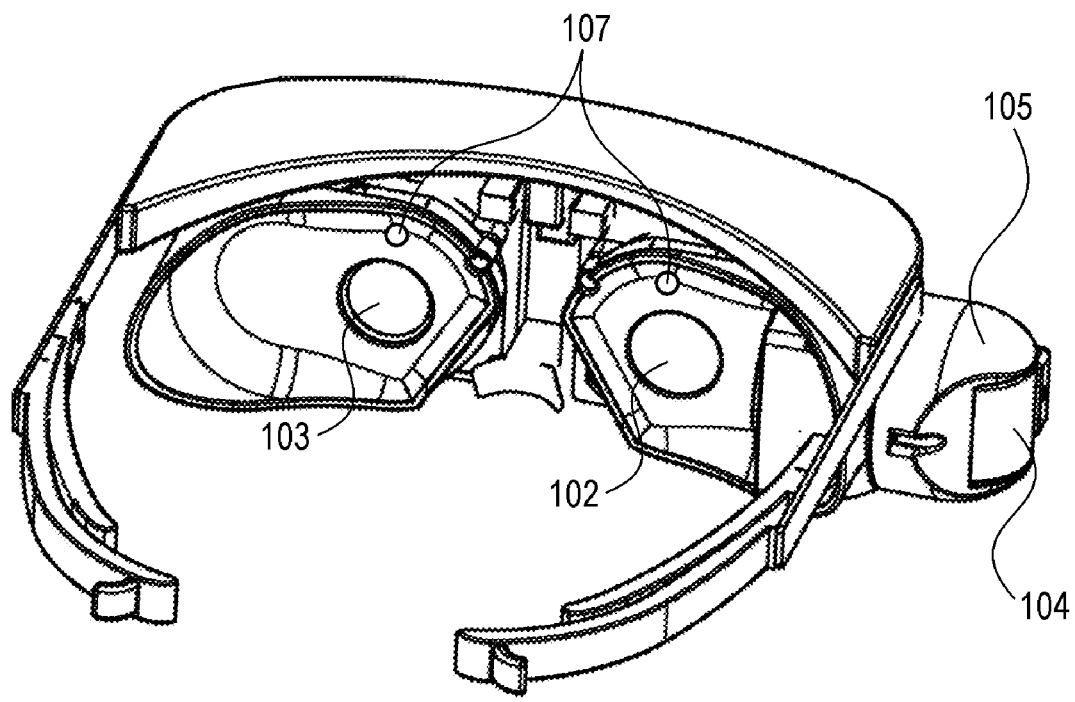

FIGS. 2A and 2B are external views of a hardware configuration of an electronic binocular telescope 10 according to Embodiment 1. FIG. 2A is a front perspective view when the electronic binocular telescope 10 is viewed from the front, and FIG. 2B is a rear perspective view when the electronic binocular telescope 10 is viewed from the back. The electronic binocular telescope 10 is a spectacle type electronic binocular telescope, and can be detachably mounted on the head. Specifically, the electronic binocular telescope 10 can be fixed (mounted) on the head by cradling the head between the left and right temples 100 of the electronic binocular telescope 10. Besides the temples 100, the electronic binocular telescope 10 includes a camera 101, displays 102 and 103, a panning unit 104, a tilting unit 105, a gyro sensor 106, a line-of-sight-detecting unit 107 and an operation member 108.

The camera 101 is an imaging unit and can be rotated in the pan direction and the tile direction independently as illustrated by arrows in FIG. 2A. In other words, the imaging direction of the camera 101 (a direction from the camera 101 to an object in the imaging range, such as a direction from the camera 101 to an object position which corresponds to the center position of the imaging range; optical axis direction of the camera 101) can be changed in the pan direction and the tilt direction independently. The panning unit 104 rotates the camera 101 in the pan direction (direction to tile the camera 101 to the left or right with respect to the electronic binocular telescope 10) by driving an actuator included in the panning unit 104. The tilting unit 105 rotates the camera 101 in the tilt direction (a direction to tilt the camera 101 up or down with respect to the electronic binocular telescope 10) by driving the actuator included in the tilting unit 105. The changing direction, mechanism and the like, to change the imaging direction, are not especially limited.

The camera 101 is configured such that the focal distance thereof can be changed. In Embodiment 1, the focal distance of the camera 101 can be switched between 100 mm and 400 mm in two stages (both focal distances have been converted into full size 35 mm) in accordance with the operation the user performed on the electronic binocular telescope 10 (user operation). The operation member 108 is a member (e.g. button, switch) to receive user operation, and receives a user operation to instruct the change (switch) of the focal distance of the camera 101, or turning the power of the electronic binocular telescope 10 ON/OFF, for example. A number of focal distances and the range thereof that can be set are not especially limited. The focal distance may be changeable seamlessly within a predetermined range.

The camera 101 has an auto focus function and is configured to automatically focus on an object included in the imaging range. Depending on the stopping position of a focusing lens (not illustrated), which is driven during focus adjustment (auto focus), an object distance at which the object is focused is uniquely determined. Therefore if information (tables and functions) that indicates the relationship between the stopping position of the focusing lens and the object distance is stored in the electronic binocular telescope 10 in advance, the electronic binocular telescope 10 can detect the object distance based on the stopping position of the focusing lens using this information. The camera 101 also includes the function to detect the object distance using this method. However, the method for detecting the object distance is not especially limited.

The displays 102 and 103 are display units that display a part of the image captured by the camera 101 as a display range. The display range may be displayed based on the image generated by developing the entire imageable range, or only the display range may be read from the camera 101 (image pickup element), and developed and displayed. When the user wears the electronic binocular telescope 10, the display 102 is disposed in front of the right eye of the user, and the display 103 is disposed in front of the left eye of the user. This means that the user views the image display on the display 102 using the right eye, and views the image displayed on the display 103 using the left eye. The display range can be moved in the pan direction (left-right direction (horizontal direction) of the captured image) and the tilt direction (up-down direction (vertical direction) of the captured image) independently. The moving direction of the display range (direction of changing the position of the display range) is not especially limited.

The gyro sensor 106 is an orientation-detecting unit that detects the orientation of the electronic binocular telescope 10, and can also detect the change of the orientation (e.g.

whether change occurred or not, direction of the change, magnitude of the change) of the electronic binocular telescope 10. In the case where the user is wearing the electronic binocular telescope 10, the orientation of the electronic binocular telescope 10 corresponds to the orientation of the head of the user. Therefore the gyro sensor 106 can detect the orientation and movement (e.g. shaking) of the head.

The line-of-sight-detecting unit (line-of-sight-detection sensor) 107 detects the line-of-sight (relative line-of-sight) of the user to the displays 102 and 103. The line-of-sight-detecting unit 107 can also detect the changes (e.g. whether change occurred or not, direction of the change, magnitude of the change) of the line-of-sight.

Figure 3:
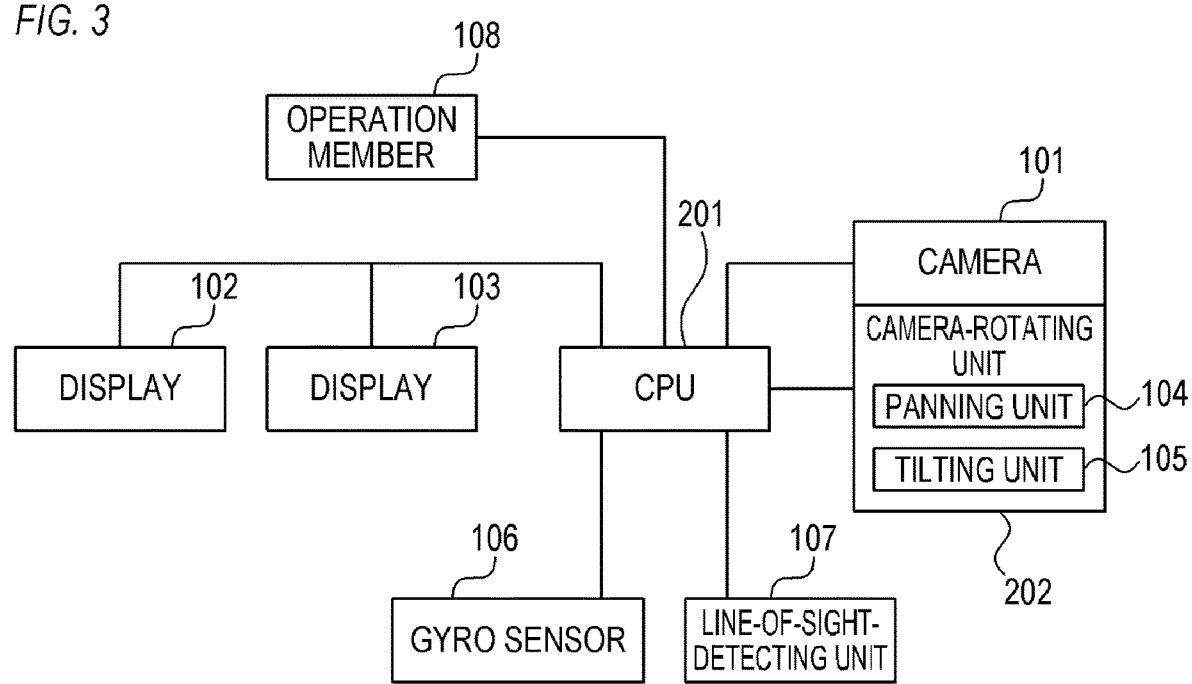
FIG. 3 is a block diagram of the electronic binocular telescope according to Embodiments 1 to 4.

FIG. 3 is a block diagram depicting a configuration of the electronic binocular telescope 10. A CPU 201 controls each component of the electronic binocular telescope 10. The CPU 201 is connected to the camera 101, the displays 102 and 103, the gyro sensor 106, the line-of-sight-detecting unit 107, the operation member 108 and a camera-rotating unit 202, and the like. The CPU 201 processes information from each component of the electronic binocular telescope 10, and controls the operation of each component in accordance with the processing result. The camera-rotating unit 202 includes the panning unit 104 and the tilting unit 105, and rotates the camera 101 in the pan direction or the tilt direction in accordance with the instruction from the CPU 201.

Figure 1:
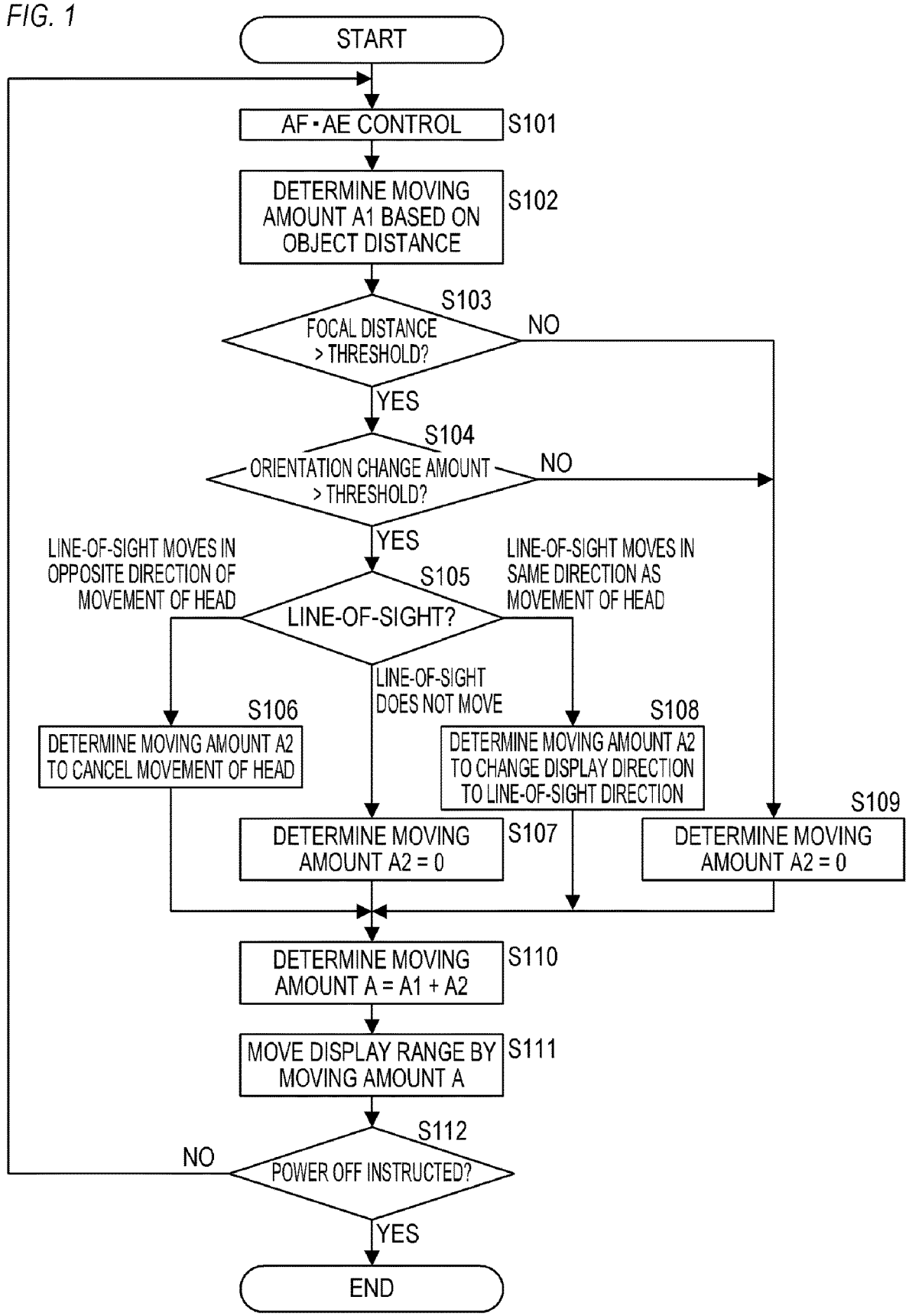
FIG. 1 is a flow chart depicting a processing flow according to Embodiment 1.

FIG. 1 is a flow chart depicting a processing flow (processing flow of the electronic binocular telescope 10) according to Embodiment 1. The processing flow in FIG. 1 is implemented, for example, by the CPU 201 developing a program, stored in ROM (not illustrated), in RAM (not illustrated), and executing the program. When the user operation, to instruct to turn the power of the electronic binocular telescope 10 ON, is performed, the electronic binocular telescope 10 starts up, and processing to display a part of the image, captured by the camera 101 as a display range on the displays (displays 102 and 103) in real-time, is started. Thereby the user can view the image captured by the camera 101 displayed on the display, and start observing the object image. Then the processing flow in FIG. 1 starts. The initial value of the focal distance (focal distance immediately after power is turned ON) of the camera 101 is not especially limited, but is preferably a wide angel focal distance so that the user can easily find an observation target. In Embodiment 1, the focal distance is controlled to 100 mm immediately after the power is turned ON. The focal distance is switched between 100 mm and 400 mm, each time the user operation to instruct to change (switch) the focal distance is performed during the processing flow in FIG. 1. (This is not indicated in FIG. 1.) Further, in Embodiment 1, it is assumed that the camera 101 is fixed so that the optical axis of the camera 101 is parallel with the front face direction of the electronic binocular telescope 10 (direction to which the face of the user wearing the electronic binocular telescope 10 is facing).

Figure 4A:
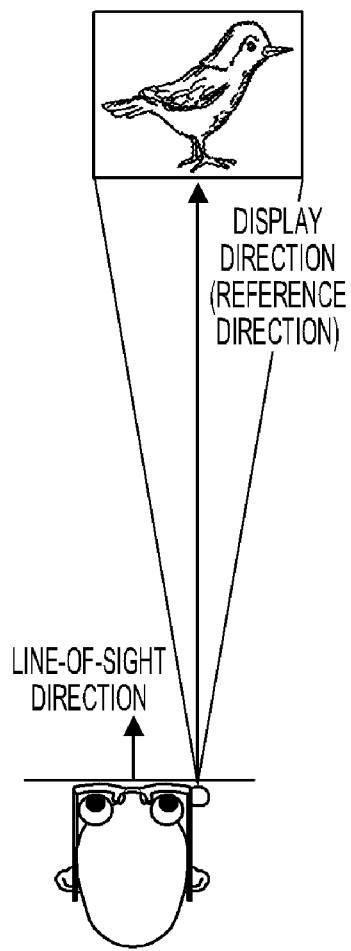
FIGS. 4A to 4D are schematic diagrams depicting states of a display device and a user according to Embodiments 1 and 2.

FIG. 4A indicates the initial direction (display direction immediately after power is turned ON; reference direction) of the display direction (direction from the camera 101 to the object in the display range, such as direction from the camera 101 to the object position corresponding to the center position of the display range). As illustrated in FIG. 4A, the reference direction is a direction matching with the optical axis of the camera 101 and is a direction parallel with the front face direction of the electronic binocular telescope 10 (direction in which the face of the user wearing the electronic binocular telescope 10 is facing). FIG. 4A is drawn from the viewpoint of viewing the head of the user from above, so that the pan direction component of the display direction can be visually understood, but this is the same for the tilt direction component of the display direction as well. In the following, only the control to change the display direction (position of the display range) in the pan direction will be described, but the display direction may also be changed in the tilt direction by the same control method as the control method to change the display direction in the pan direction.

In S101 in FIG. 1, the camera 101 performs auto focus (AF) control and auto exposure (AE) control based on the captured image.

In S102, the camera 101 detects (acquires) the object distance L from the result of the AF control in S101, and the CPU 201 determines (calculates) the moving amount A1 of the display range based on the detected object distance L.

Figure 5:
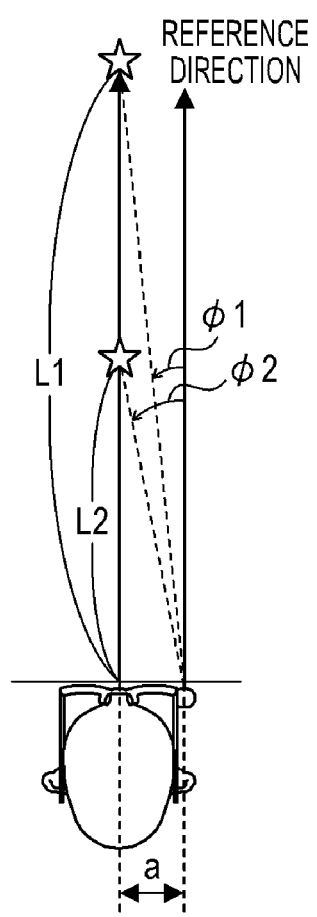
FIG. 5 is a schematic diagram depicting a relationship between an object distance and a moving amount according to Embodiments 1 and 2.

FIG. 5 indicates the relationship between the object distance L and the moving amount A1. A star symbol in FIG. 5 indicates the observation target that exists in front of the user. Normally in the case of observation with the naked eye, the user faces the object and captures the object at the center of the field-of-view. Here a case where the display direction is the reference direction will be considered. In this case, depending on the position at which the camera 101 is installed, the observation target, which the user would capture at the center of the field-of-view if the user were viewing with the naked eye, may not be displayed at the center of the display, and the user may feel a sense of discomfort. The moving amount A1 determined in S102 is a moving amount to reduce such a sense of discomfort. Here it is assumed that, moving direction to the left is a positive direction, and a moving direction to the right is a negative direction. In FIG. 5, the camera 101 is installed at a position that is shifted to the right side from the center of the head by the distance a. Therefore if the display range is moved by a moving amount $A1=\varphi1=\arctan(a/L1)$, the observation target existing at the object distance L1 (observation target existing in front of the user) can be displayed at the center of the display. In the same manner, if the distance range is moved by a moving amount $A1=\varphi2=\arctan(a/L2)$, the observation target existing at the object distance L2 (observation target existing in front of the user) can be displayed at the center of the display. In this way, in S102, the moving amount A1, which is longer as the object distance is shorter, is determined based on the relational expression "$A1=\arctan(a/L)$" from the object distance L. According to this relational expression, the moving amount A1 becomes virtually 0 (zero) when the object distance L is relatively long. Therefore in a case where observation is basically performed only for an object at long distance, or in a case where the object distance L is longer than a predetermined distance, the moving amount A1 may be set to 0 (moving amount A1=0).

In S103 in FIG. 1, the CPU 201 determines whether the focal distance of the camera 101 is longer than a threshold (predetermined distance). Processing advances to S104 if the focal distance is longer than the threshold, and processing advances to S109 if the focal distance is the threshold or less. It is also acceptable that processing advances to S104 if the focal distance is the threshold or more, and processing advances to S109 if the focal distance is less than the threshold. In Embodiment 1, the focal distances that can be set are 100 mm and 400 mm, hence in S103, it is determined whether the focal distance is 400 mm or not, and processing advances to S104 if the focal distance is 400 mm, and processing advances to S109 if the focal distance is 100 mm.

In S104, the CPU 201 detects the orientation of the electronic binocular telescope 10 (head) using the gyro sensor 106, and determines whether the orientation of the electronic binocular telescope 10 (head) changed by a change amount larger than a threshold (predetermined amount). Processing advances to S105 if the orientation changed by a change amount lager than the threshold, and processing advances to S109 if the change amount of the orientation is the threshold or less. It is also acceptable that processing advances to S105 if the orientation changed by the threshold or a larger change amount, and processing advances to S109 if the change amount of the orientation is less than the threshold.

In S105, using the line-of-sight-detecting unit 107, the CPU 201 detects the line-of-sight of the user in a period when the orientation of the electronic binocular telescope 10 (head) is changing, and switches processing so that the position of the display range is controlled based on this line-of-sight.

Figure 4B:
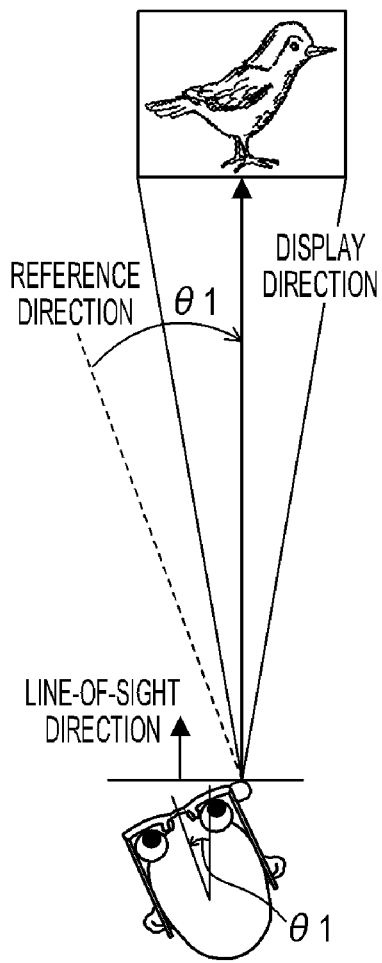

FIG. 4B indicates a state where the head of the user unintentionally moved in the state of FIG. 4A. In the case where the head moves unintentionally, the absolute line-of-sight is more likely to be maintained in an approximate constant state. Therefore in FIG. 4B, the head moved to the left (positive direction) by the angle θ1, but the direction of the absolute line-of-sight remains at the original reference direction (reference direction before the head moved; reference direction in FIG. 4A). In other words, the movement to the right (negative direction; opposite direction of the movement of the head) by the angle θ1 is generated as a relative movement of the line-of-sight with respect to the display. When the head moves, the electronic binocular telescope 10 moves integrally with the head. Therefore in FIG. 4B, the electronic binocular telescope 10 also moves to the left by the angle θ1. In the state of FIG. 4B, using the gyro sensor 106, the CPU 201 determines that the electronic binocular telescope 10 (head) moved to the left by the angle θ1. Furthermore, using the line-of-sight-detecting unit 107, the CPU 201 determines that the line-of-sight (relative line-of-sight) moved to the right (opposite direction of the movement of the electronic binocular telescope 10 (head)) by the angle θ1.

In the case where the line-of-sight (relative line-of-sight) changed to the opposite direction of the change direction of the orientation of the electronic binocular telescope 10 (head) like this, processing advances to S106 based on the determination that the user does not desire to change the viewing direction (line-of-sight direction) and the head unintentionally moved. Then in S106, the CPU 201 determines (calculates) the moving amount A2 to move the display range such that the angle-of-view immediately before the detection of the movement of the head is maintained. In other words, the CPU 201 determines the moving amount A2 to move the display range such that the movement of the head is cancelled. In the state of FIG. 4B, the moving amount A2 to rotate the display direction to the right by the angle θ1 is determined. At this time, the moving amount A2 may be determined based on the detection result by the gyro sensor 106 (angle θ1 in the left direction), or may be determined based on the detection result by the line-of-sight-detecting unit 107 (angle θ1 in the right direction), or may be determined based on both of these detection results. The angle (degree) detected by the gyro sensor 106 and the angle (degree) detected by the line-of-sight-detecting unit 107 may be different.

In the example described above, the moving amount A2, to make the change of the display direction caused by the change of the orientation of the electronic binocular telescope 10 (head) to 0 (zero), is determined by S106, but the moving amount A2 determined in S106 is not limited to this. All that is required here is to decrease the change of the display direction caused by the change of the orientation, and the change of the display direction need not be exactly 0 (zero).

Figure 4C:
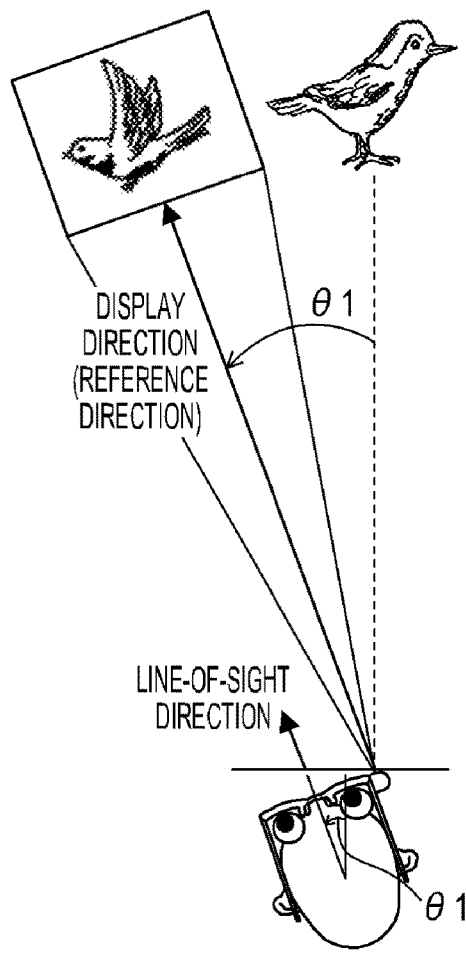

FIG. 4C indicates a state where the user intentionally moved their head in the state of FIG. 4A in order to change the observation target. In the case of intentionally moving the head, the absolute line-of-sight is more likely to move in the same direction as the moving direction of the head. Therefore in FIG. 4C, an integrated movement of the head and the absolute line-of-sight occurred. Specifically, the head moves to the left by the angle θ1, and the absolute line-of-sight also moves to the left by the angle θ1. In other words, no movement of the line-of-sight relative to the display is generated. In the state of FIG. 4C, using the gyro sensor 106, the CPU 201 determines that the electronic binocular telescope 10 (head) moved to the left by the angle θ1. Furthermore, using the line-of-sight-detecting unit 107, the CPU 201 determines that the line-of-sight (relative line-of-sight) is not moved.

In the case where only the change of the orientation of the electronic binocular telescope 10 (head) is detected like this, processing advances to S107 based on the determination that the user intentionally moved their head in order to change the viewing direction in accordance with the movement of the head. Then in S107, the CPU 201 determines the moving amount A2=0 which does not move the display range. In other words, the CPU 201 determines the moving amount A2 to maintain the display direction in the line-of-sight direction (direction of the line-of-sight).

Figure 4D:
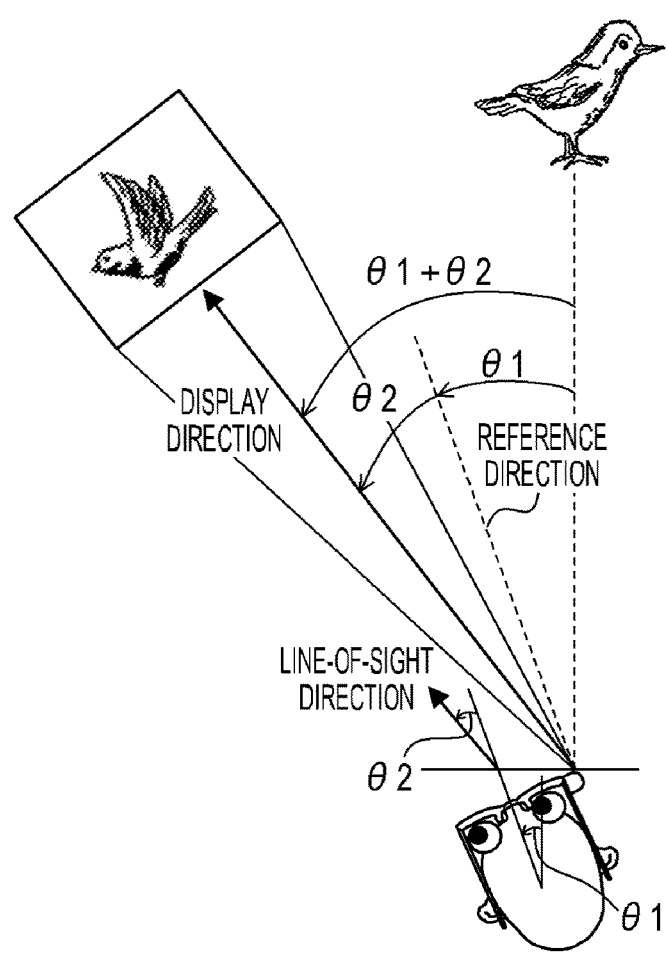

FIG. 4D indicates a state where the user intentionally moved their head in the state of FIG. 4A, in order to track (visually follow) an observation target (moving object) that moves fast. In the case of tracking an observation target that moves fast, the absolute line-of-sight is more likely to move by a moving amount larger than the moving amount of the head (including the moving amount of the head) in the same direction as the moving direction of the head. Therefore in FIG. 4D, the head moves to the left by the angle θ1, and the absolute line-of-sight moves to the left by the angle θ1+θ2. In other words, the relative movement of the line-of-sight with respect to the display is generated to the left by the angle θ2. In the state of FIG. 4D, using the gyro sensor 106, the CPU 201 determines that the electronic binocular telescope 10 (head) moved to the left by the angle θ1. Furthermore, using the line-of-sight-detecting unit 107, the CPU 201 determines that the line-of-sight (relative line-of-sight) moved to the left by the angle θ2.

In the case where the line-of-sight (relative line-of-sight) changed in the same direction as the change direction of the orientation of the electronic binocular telescope 10 (head) like this, processing advances to S108 based on the determination that the user intentionally moved their head in order to radically change the viewing direction. Then in S108, the CPU 201 determines the moving amount A2 to change the display direction to the line-of-sight direction.

The moving amount A2 that is determined in S108 is not limited to the moving amount to change the display direction to the line-of-sight direction. All that is required here is to increase the change of the display direction caused by the change of the orientation, and the display direction need not match with the line-of-sight direction.

In S109, the CPU 201 determines the moving amount A2 as 0 (A2=0). In a case where the focal distance is short (in the case of a wide angle-of-view; corresponds to NO in S103), the change of the observation range (object range (angle-of-view) of an image displayed on the display) caused by unintentional change of orientation (unintentional movement of the head) of the electronic binocular telescope 10 normally does not stand out very much. In a case where the change amount of the orientation of the electronic binocular telescope 10 (head) is small (corresponds to NO in S104), the change of the observation range caused by the unintentional change of orientation of the electronic binocular telescope 10 does not stand out very much, and the user may move the line-of-sight so as to look out over the observation range. Therefore in Embodiment 1, processing can advance to S109 in such cases. At this time, the line-of-sight detection is not performed, or even if the line-of-sight detection is performed, the detection result thereof is not used. When the focal distance is long (focal distance of telephoto observation; focal distance at which the change of the observation range caused by unintentional change of orientation of the electronic binocular telescope 10 tends to stand out), the processing in S103 may be omitted so that processing can advance to S104 regardless the focal distance.

In S110, the CPU 201 determines (calculates) the final moving amount A=A1+A2 of the display range, based on the moving amount A1 determined in S102 and the moving amount A2 determined in any step of S106 to S109. In the case where it is predetermined that the moving amount A1 is 0 (A1=0), such as a case where the observation is basically performed on the objects at long distance, the processing in S102 may be omitted so that the moving amount A=A2 is determined regardless the object distance L.

In S111, the CPU 201 moves the display range by the moving amount A determined in S110.

In S112, the CPU 201 monitors information from the operation member 108, and determines whether the user operation, to instruct to turn the power of the electronic binocular telescope 10 OFF, was performed. The processing steps S101 to S111 are repeated until the power OFF is instructed, and if a power OFF is instructed, the processing flow in FIG. 1 ends, and the electronic binocular telescope 10 stops (power of the electronic binocular telescope 10 is shut OFF).

As described above, in Embodiment 1, the position of the display range is not controlled based on the detected line-of-sight if the change amount of the detected orientation (orientation of the electronic binocular telescope 10 (head)) is smaller than a predetermined amount. The position of the display range is controlled based on the detected line-of-sight if the change amount of the detected orientation is larger than the predetermined amount. Thereby an unintentional change of the observation range can be minimized, and a sensation close to the observation with the naked eye (sensation with no or minimal sense of discomfort) can be provided to the user.

Besides the control of the position of the display range in the processing flow of FIG. 1, the position of the display range may be constantly controlled based on the shaking of the electronic binocular telescope 10, such as camera shake correction. Specifically, the position of the display range may be constantly controlled so that the shaking in the display direction caused by the shaking of the electronic binocular telescope 10 is minimized. The shaking in the display direction (display position (object position corresponding to the display range, such as an object position corresponding to the center position in the display range)) caused by the electronic binocular telescope 10 that is shaken in the front-back, top-bottom or left-right directions, while the orientation of the electronic binocular telescope 10 remains the same, may be minimized. Further, the shaking in the display direction caused by the shaking of the orientation of the electronic binocular telescope 10 may be minimized. Furthermore, both of the above mentioned shakings may be minimized. The shaking of the electronic binocular telescope 10 may be detected by the gyro sensor 106, or may be detected by a member (sensor) that is different from the gyro sensor 106. The method for detecting the shaking of the electronic binocular telescope 10 is not especially limited. For example, the shaking (micro-vibration) at a predetermined frequency may be detected and shaking in the display direction caused by this shaking may be minimized. Moreover, vibration (camera shake) may be determined in a case where a value of a shaking signal (detection result) outputted from the vibration sensor is less than a threshold, and an orientation change that is not vibration may be determined in a case where the value of the shaking signal is the threshold or more. The vibration and the change of orientation that is not vibration can be distinguished and detected using various techniques disclosed in Japanese Patent Application Laid-open No. 2015-75697 or the like.

Instead of the control of the position of the display range based on the shaking of the electronic binocular telescope 10, the imaging direction of the camera 101 may be controlled. Specifically, the imaging direction may be controlled such that the shaking in the display direction caused by the shaking of the electronic binocular telescope 10 is minimized.

In the same manner, the imaging direction may be controlled instead of the control of the position of the display range (movement by the moving amount A1) based on the object distance L.

The control method for moving the display range to the pan direction may be different from the control method for moving the display range to the tilt direction. For example, moving the display range to one of the pan direction and the tilt direction may not be performed, and moving the display range to the other of the pan direction or the tile direction may be performed in accordance with the processing flow in FIG. 1.

Embodiment 2

Embodiment 2 of the present invention will be described next. In the example described in Embodiment 1, when the change amount of the orientation of the electronic binocular telescope 10 (head) is larger than a predetermined amount, the processing is switched in accordance with the result of the comparison between the change direction of the orientation of the electronic binocular telescope 10 and the change direction of the line-of-sight, and depending on whether the line-of-sight is changed or not, whereby the moving amount A2 is determined. In Embodiment 2, an example of determining the moving amount A2 in accordance with the detected line-of-sight without considering the orientation of the electronic binocular telescope 10, in a case where the change amount of the orientation of the electronic binocular telescope 10 is larger than a predetermined amount, will be described. In the following, aspects (configuration, processing or the like) different from Embodiment 1 will be described in detail, and aspects the same as Embodiment 1 will be omitted unless description is necessary.

Figure 6:
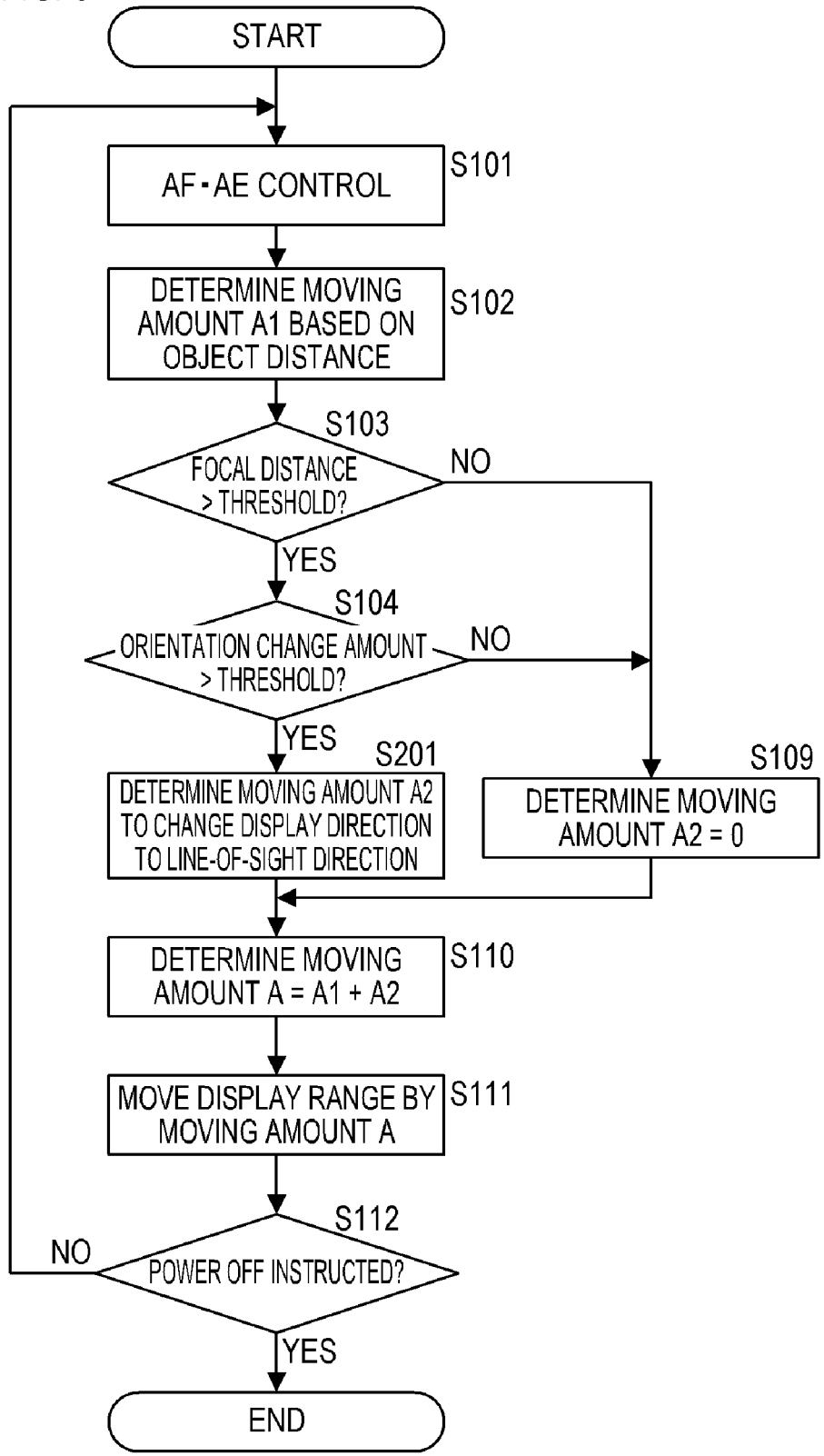
FIG. 6 is a flow chart depicting a processing flow according to Embodiment 2.

FIG. 6 is a flow chart depicting the processing flow (processing flow of the electronic binocular telescope 10) according to Embodiment 2, and is a modification of the flow chart in FIG. 1. In FIG. 6, a same processing step as FIG. 1 is denoted with a same reference sign as FIG. 1. In a case where the orientation changed by a change amount larger than the threshold (YES in S104), processing advances to S201, and to S110 after S201. In S201, the CPU 201 detects the line-of-sight of the user using the line-of-sight-detecting unit 107, and determines the moving amount A2 to match the display direction with the detected direction of the line-of-sight.

As described above, in Embodiment 2 as well, the position of the display range is not controlled based on the detected line-of-sight if the change amount of the detected orientation (orientation of the electronic binocular telescope 10 (head)) is smaller than a predetermined amount. The position of the display range is controlled based on the etected line-of-sight if the change amount of the detected orientation is larger than the predetermined amount. Thereby the same effect as Embodiment 1 can be acquired.

Embodiment 3

Embodiment 3 of the present invention will be described next. In the following, aspects (configuration, processing and the like) different from Embodiment 1 will be described in detail, and aspects the same as Embodiment 1 will be omitted unless description is necessary. In Embodiment 3, the displays 102 and 103 display an image (e.g. entire image) captured by the camera 101.

Figure 7:
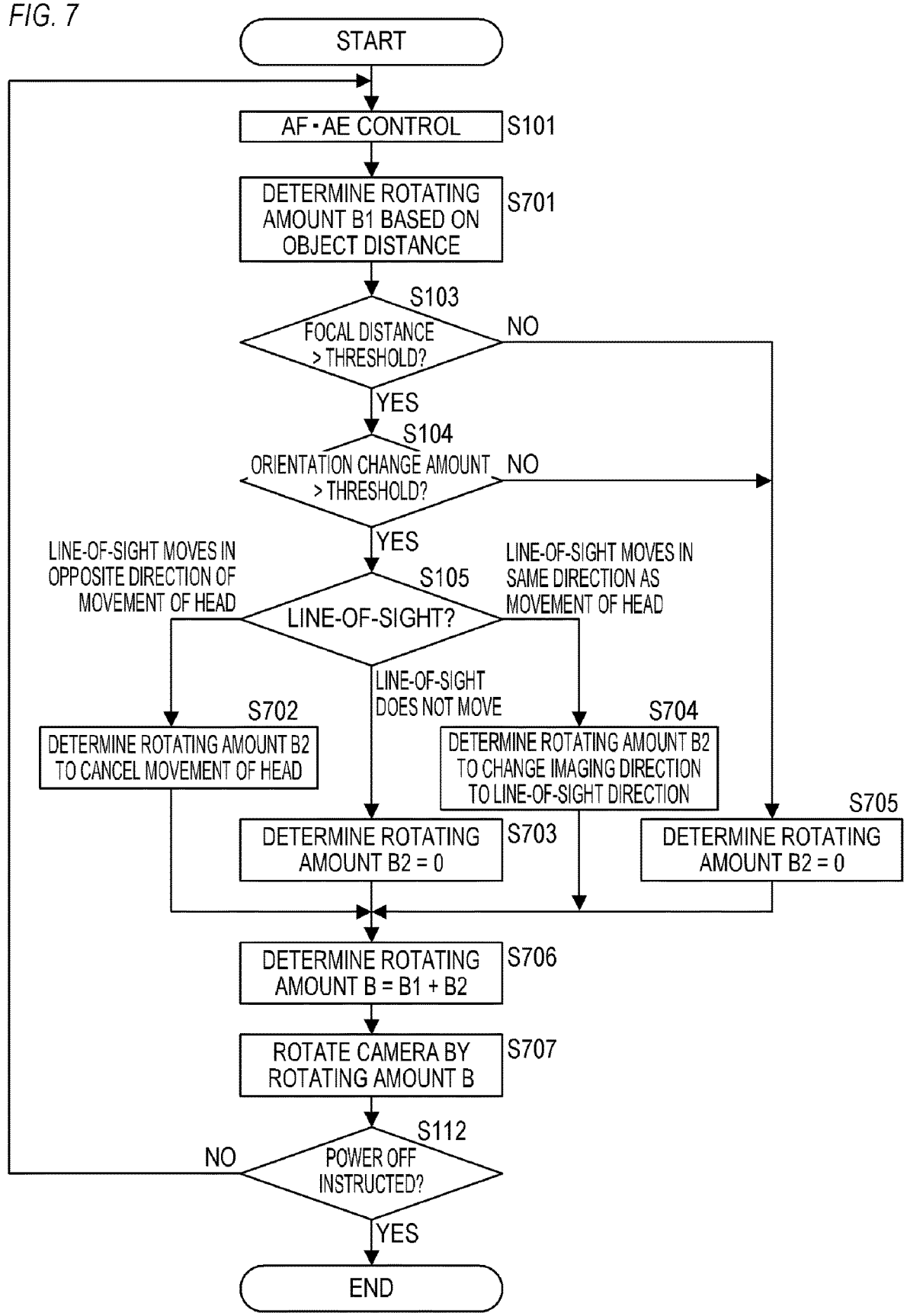
FIG. 7 is a flow chart depicting a processing flow according to Embodiment 3.

FIG. 7 is a flow chart depicting the processing flow (processing flow of the electronic binocular telescope 10) according to Embodiment 3, and is a modification of the flow chart in FIG. 1. In FIG. 7, a same processing step as FIG. 1 is denoted with a same reference sign as FIG. 1.

FIG. 8A indicates the internal direction (imaging direction immediately after power is turned ON; reference direction) of the imaging direction of the camera 101. As illustrated in FIG. 8A, the reference direction is a direction where the optical axis of the camera 101 is parallel with the front direction of the electronic binocular telescope 10 (direction in which the face of the user wearing the electronic binocular telescope 10 is facing). FIG. 8A is drawn from the viewpoint viewing the head of the user from above, so that the pan direction component of the imaging direction can be visually understood, but this is the same for the tilt direction component of the imaging direction as well. In the following, only the control to change the imaging direction in the pan direction will be described, but the imaging direction may also be changed in the tilt direction by the same method as the control method to change the imaging direction in the pan direction.

In FIG. 7, processing steps S701 and S702 to S707 are performed instead of the processing steps S102 and S106 to S111 in FIG. 1.

In S701, the camera 101 detects (acquires) the object distance L from the result of the AF control in S101, and CPU 201 determines (calculates) the rotating amount B1 of the camera 101 based on the detected object distance L.

Figure 9:
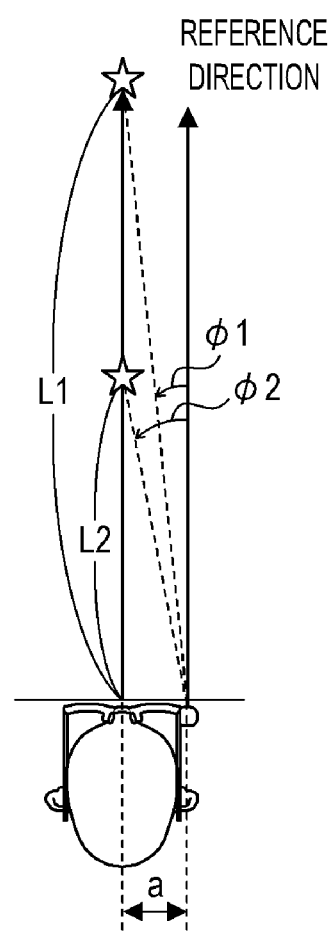
FIG. 9 is a schematic diagram depicting a relationship between an object distance and a rotating amount according to Embodiments 3 and 4.

FIG. 9 indicates the relationship between the object distance L and the rotating amount B1. The star symbol in FIG. 9 indicates the observation target that exists in front of the user. Normally in the case of the observation with the naked eye, the user faces the object and captures the object at the center of the field-of-view. Here a case where the imaging direction of the camera 101 is the reference direction will be considered. In this case, depending on the position at which the camera 101 is installed, the observation target, which the user would capture at the center of the field-of-view of the user were viewing with their naked eye, may not be displayed at the center of the display, and the user may have a sense of discomfort. The rotating amount B1 determined in S701 is a rotating amount to reduce such a sense of discomfort. Here it is assumed that a rotating direction to the left is a positive direction, and a rotating direction to the right is a negative direction. In FIG. 9, the camera 101 is installed at a position that is shifted to the right from the center of the head by the distance a. Therefore if the camera 101 is rotated by the rotating amount B1=φ1=arctan (a/L1), the observation target existing at the object distance L1 (observation target existing in front of the user) can be displayed at the center of the display. In the same manner, if the camera 101 is rotated by a rotating amount B1=φ2=arctan (a/L2), the observation target existing at the object distance L2 (observation target existing in front of the user) can be displayed at the center of the display. In this way, in S701, the rotating amount B1, which is larger as the object distance is shorter, is determined based on the relationship expression "B1=arctan (a/L)" from the object distance L. According to this relationship expression, the rotating amount B1 becomes virtually 0 (zero) when the object distance L is relatively long. Therefore in a case where observation is basically performed only for an object at long distance, or in a case where the object distance L is longer than a predetermined distance, the rotating amount B1 may be set to 0 (rotating amount B1=0).

In S105 in FIG. 7, using the line-of-sight-detecting unit 107, the CPU 201 detects the line-of-sight of the user in a period when the orientation of the electronic binocular telescope 10 (head) is changing, and switches processing so that the imaging direction of the camera 101 is controlled based on this line-of-sight.

FIG. 8B indicates a state where the head of the user unintentionally moved in the state of FIG. 8A. In a case where the head moves unintentionally, the absolute line-of-sight is more likely to be maintained in an approximate constant state. Therefore in FIG. 8B, the head moved to the left (positive direction) by the angle θ1, but the direction of the absolute line-of-sight remains at the original reference direction (reference direction before the head moved; reference direction in FIG. 8A). In other words, the movement to the right (negative direction; opposite direction of the movement of the head) by the angle θ1 is generated as a relative movement of the line-of-sight with respect to the display. When the head moves, the electronic binocular telescope 10 moves integrally with the head. Therefore in FIG. 8B, the electronic binocular telescope 10 also moved to the left by the angle θ1. In the state in FIG. 8B, using the gyro sensor 106, the CPU 201 determines that the electronic binocular telescope 10 (head) moved to the left by the angle θ1. Furthermore, using the line-of-sight-detecting unit 107, the CPU 201 determines that the line-of-sight (relative line-of-sight) moved to the right (opposite direction of the movement of the electronic binocular telescope 10 (head)) by the angle θ1.

In the case where the line-of-sight (relative line-of-sight) changed to the opposite direction of the change direction of the orientation of the electronic binocular telescope 10 (head) like this, processing advances to S702 based on the determination that the user does not desire to change the viewing direction (line-of-sight direction) and the head unintentionally moved. Then in S702, the CPU 201 determines (calculates) the rotating amount B2 to rotate the camera 101 such that the angle-of-view immediately before the detection of the movement of the head is maintained. In other words, the CPU 201 determines the rotating amount B2 to rotate the camera 101 such that the movement of the head is cancelled. In the state of FIG. 8B, the rotating amount B2 to rotate the camera 101 to the right by the angle θ1 is determined. At this time, the rotating amount B2 may be determined based on the detection result by the gyro sensor 106 (angle θ1 in the left direction), or may be determined based on the detection result by the line-of-sight-detecting unit 107 (angle θ1 in the right direction), or may be determined based on both of these determination results. The angle (degree) detected by the gyro sensor 106 and the angle (degree) detected by the line-of-sight-detecting unit 107 may be different.

In the example described above, the rotating amount B2 to make the change of the imaging direction of the camera 101 caused by the change of the orientation of the electronic binocular telescope 10 (head) to 0 (zero), is determined in S702, but the rotating amount B2 determined in S702 is not limited to this. All that is required here is to decrease the change of the imaging direction caused by the change of the orientation, and the change of the imaging need not be exactly 0 (zero).

Figure 8C:
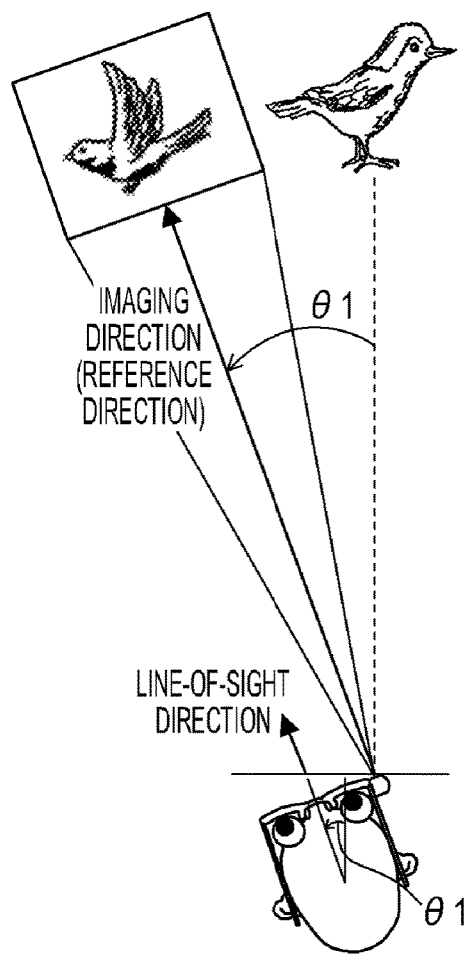

FIG. 8C indicates a state where the user intentionally moved their head in the state of FIG. 8A in order to change the observation target. In the case of intentionally moving the head, the absolute line-of-sight is more likely to move in the same directions as the moving direction of the head. Therefore in FIG. 8C, an integrated movement of the head and the absolute line-of-sight occurred. Specifically, the head moves to the left by the angle θ1, and the absolute line-of-sight also moves to the left by the angle θ1. In other words, the movement of the line-of-sight relative to the display is not generated. In the state of FIG. 8C, using the gyro sensor 106, the CPU 201 determines that the electronic binocular telescope 10 (head) moved to the left by the angle θ1. Furthermore, using the line-of-sight-detecting unit 107, the CPU 201 determines that the line-of-sight (relative line-of-sight) is not moved.

In the case where only the change of the orientation of the electronic binocular telescope 10 (head) is detected like this, processing advances to S703 based on the determination that the user intentionally moved their head in order to change the viewing direction in accordance with the movement of the head. Then in S703, the CPU 201 determines the rotating amount B2=0 which does not rotate the camera 101. In other words, the CPU 201 determines the rotating amount B2 to maintain the imaging direction of the camera 101 in the line-of-sight direction (direction of the line-of-sight).

Figure 8D:
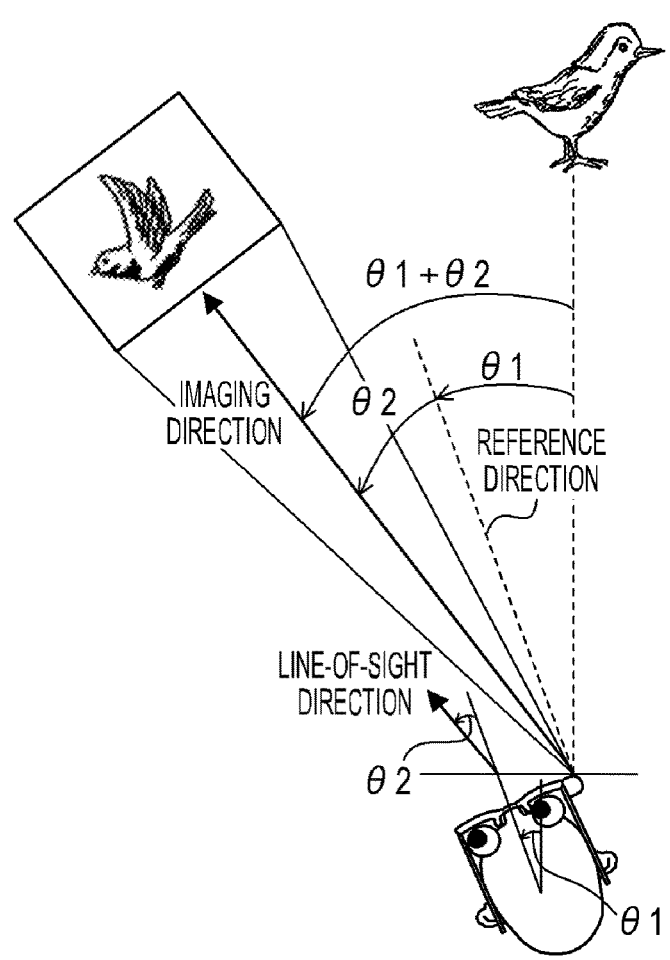

FIG. 8D indicates a state where the user intentionally moved their head in the state of FIG. 8A, in order to track (visually follow) an observation target (moving object) that moves fast. In the case of tracking an observation target that moves fast, the absolute line-of-sight is more like to move by a moving amount larger than the moving amount of the head (including the moving amount of the head) in the same direction as the moving direction of the head. Therefore in FIG. 8D, the head moves to the left by the angle θ1, and the absolute line-of-sight moves to the left by the angle θ1+θ2. In other words, the relative movement of the line-of-sight, with respect to the display, is generated to the left by the angle θ2. In the state of FIG. 8D, using the gyro sensor 106, the CPU 201 determines that the electronic binocular telescope 10 (head) moved to the left by the angle θ1. Furthermore, using the line-of-sight-detecting unit 107, the CPU 201 determines that the line-of-sight (relative line-of-sight) moved to the left by the angle θ2.

In the case where the line-of-sight (relative line-of-sight) changed in the same direction as the change direction of the orientation of the electronic binocular telescope 10 (head) like this, processing advances to S704 based on the determination that the user intentionally moved their head in order to radically change the viewing direction. Then in S704, the CPU 201 determines the rotating amount B2 to change the imaging direction of the camera 101 to the line-of-sight direction.

The rotating amount B2 that is determined in S704 is not limited to the rotating amount to change the imaging direction to the line-of-sight direction. All that is required here is to increase the change of the imaging direction caused by change of orientation, and the imaging direction need not match with the line-of-sight direction.

In S705, the CPU 201 determines the rotating amount B2=0. In a case where the focal distance is short (in a case of a wide angle-of-view; corresponds to NO in S103), the change of the observation range (object range (angle-of-view) of an image displayed on the display) caused by an unintentional change of orientation (unintentional movement of the head) of the electronic binocular telescope 10, normally does not standout very much. In a case where the change amount of the orientation of the electronic binocular telescope 10 (head) is small (corresponds to NO in S104), the change of the observation range caused by the unintentional change of the orientation of the electronic binocular telescope 10 does not standout very much, and the user may move the line-of-sight so as to look out over entire observation range. Therefore in Embodiment 3, processing can advance to S705 in such cases. At this time, the line-of-sight detection is not performed, and even if the line-of-sight detection is performed, the detection result thereof is not used. When the focal distance is long (focal distance of telephoto observation; focal distance at which the change of the observation range caused by unintentional change of orientation of the electronic binocular telescope 10 tends to standout), the processing in S103 may be omitted so that processing can advance to S104 regardless the focal distance.

In S706, the CPU 201 determines (calculates) the final rotating amount B=B1+B2 of the camera 101, based on the rotating amount B1 determined in S701 and the rotating amount B2 determined in any step of S702 to S705. In the case where it is predetermined that the rotating amount B1 is 0 (B1=0), such as a case where the observation is basically performed on the objects at long distance, the processing in S701 may be omitted so that the rotating amount B=B2 is determined regardless the object distance L.

In S707, the CPU 201 rotates the camera 101 by the rotating amount B determined in S706, using the camera-rotating unit 202.

As described above, in Embodiment 3, the imaging direction of the camera 101 is not controlled based on the detected line-of-sight if the change amount of the detected orientation (orientation of the electronic binocular telescope 10 (head)) is smaller than a predetermined amount. The imaging direction is controlled based on the detected line-of-sight if the change amount of the detected orientation is larger than the predetermined amount. Thereby an unintended change of the observation range can be minimized, and a sensation close to the observation with the naked eye (sensation with no or minimal sense of discomfort) can be provided to the user.

Besides the control of the imaging direction in the processing flow in FIG. 7, the imaging direction may be constantly controlled based on the shaking of the electronic binocular telescope 10, such as camera shake correction. Specifically, the imaging direction may be constantly controlled so that the shaking in the imaging direction caused by the shaking of the electronic binocular telescope 10 is minimized. The shaking in the imaging direction (imaging position (object position corresponding to the imaging range, such as an object position corresponding to the center position in the imaging range; optical axis position of the camera 101) caused by the electronic binocular telescope 10 that is shaken in the front-back, top-bottom, or left-right directions, while the orientation of the electronic binocular telescope 10 remains the same, may be minimized. Further, the shaking in the imaging direction caused by the shaking of the orientation of the electronic binocular telescope 10 may be minimized, or both of the above mentioned shakings may be minimized. The shaking of the electronic binocular telescope 10 may be detected by the gyro sensor 106, or may be detected by a member (sensor) that is different from the gyro sensor 106. The method for detecting the shaking of the electronic binocular telescope 10 is not especially limited. For example, the shaking (micro-vibration) at a predetermined frequency may be detected, and shaking in the imaging direction caused by this shaking may be minimized. Moreover, vibration (camera shake) may be determined om a case where a value of a shaking signal (detection result) outputted from the vibration sensor is less than a threshold, and the orientation change that is not vibration may be determined when the value of the shaking signal is the threshold or more. The vibration and the change of the orientation that is not vibration can be distinguished and detected using various techniques disclosed in Japanese Patent Application Laid-open No. 2015-75697 or the like.

A possible configuration here is that a part of the captured image is displayed on the display as a display range. In this case, instead of the control of the imaging direction based on the shaking of the electronic binocular telescope 10, the position of the display range may be controlled. Specifically, the position of the display range may be controlled such the shaking in the display directions caused by the shaking of the electronic binocular telescope 10 (direction from the camera 101 to the object corresponding to the display range, such as a direction from the camera 101 to an object position corresponding to the center position of the display range) is minimized.

In the same manner, in the case of displaying a part of the captured image on the display as the display range, the position of the display range may be controlled, instead of the control of the imaging direction (rotation by the rotating amount B1) based on the object distance L.

The control method for changing the imaging direction to the pan direction may be different from the control method for changing the imaging direction to the tilt direction. For example, a change of the imaging direction to one of the pan dire direction and the tilt direction may not be performed, and a change of the imaging direction to the other of the pan direction and the tilt direction may be performed in accordance with the processing flow in FIG. 7.

Embodiment 4

Embodiment 4 of the present invention will be described next. In the example described in Embodiment 3, when the change amount of the orientation of the electronic binocular telescope 10 (head) is larger than a predetermined amount, the processing is switched in accordance with the result of the comparison between the change direction of the orientation of the electronic binocular telescope 10 and the change direction of the line-of-sight, and depending on whether the line-of-sight changed or not, whereby the rotating amount B2 is determined. In Embodiment 4, an example of determining the rotating amount B2 in accordance with the detected line-of-sight without considering the orientation of the electronic binocular telescope 10 in a case where the change amount of the orientation of the electronic binocular telescope 10 is larger than a predetermined amount, will be described. In the following, aspects (configuration, processing and the like) different from Embodiment 3 will be described in detail, and aspect the same as Embodiment 3 will be omitted unless description is necessary.

Figure 10:
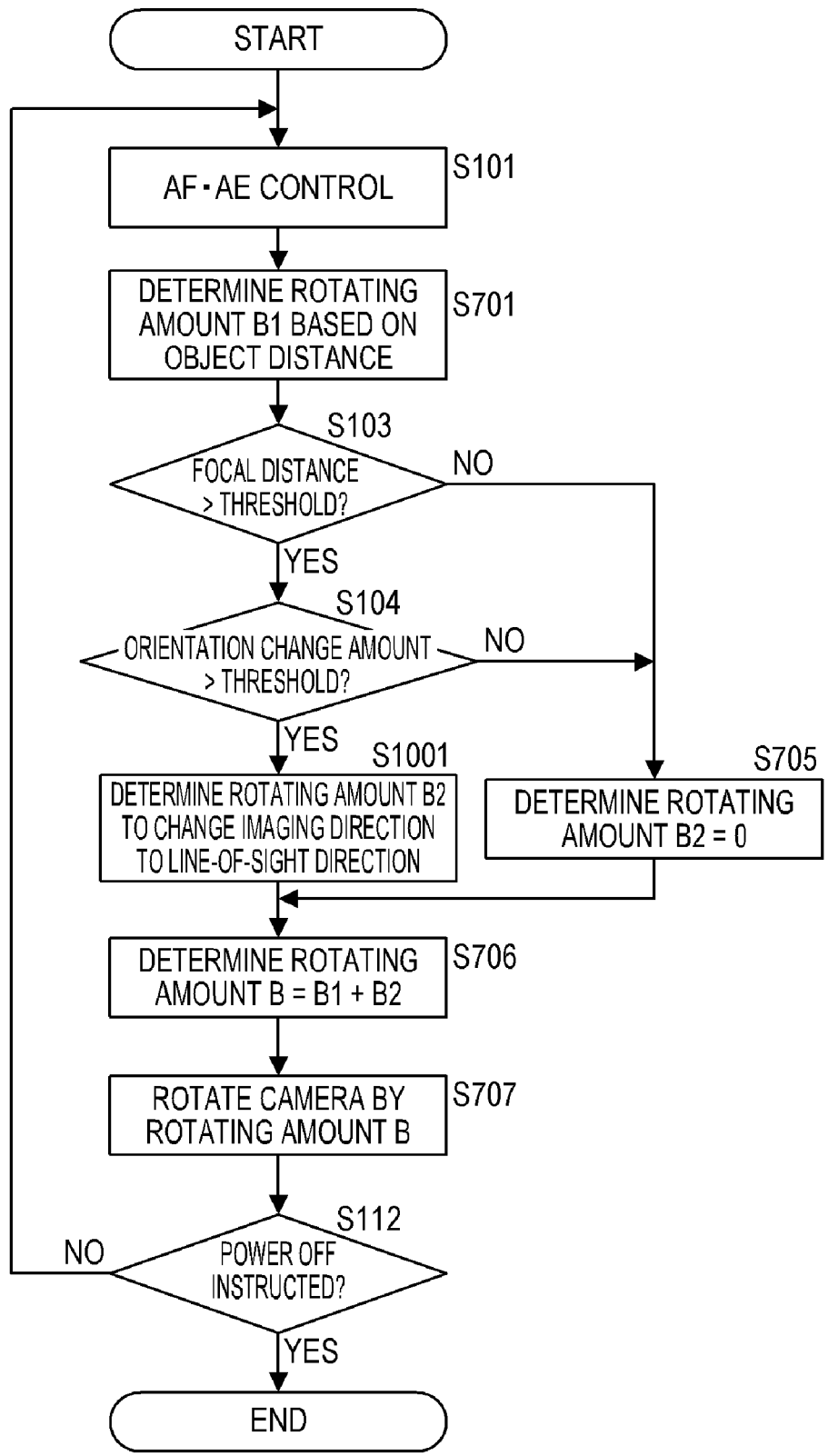
FIG. 10 is a flow chart depicting a processing flow according to Embodiment 4.

FIG. 10 is a flow chart depicting the processing flow (processing flow of the electronic binocular telescope 10) according to Embodiment 4, and is a modification of the flow chart in FIG. 7. In FIG. 10, a same processing step as FIG. 7 is denoted with the same reference sign as FIG. 7. In a case where the orientation changed by a change amount larger than the threshold (YES in S104), processing advances to S1001, and to S706 after S1001. In S1001, the CPU 201 detects the line-of-sight of the user using the line-of-sight-detecting unit 107, and determines the rotating amount B2 to match the imaging direction with the detected direction of the line-of-sight.

As described above, in Embodiment 4 as well, the imaging direction of the camera 101 is not controlled based on the detected line-of-sight if the change amount of the detected orientation (orientation of the electronic binocular telescope 10 (head)) is smaller than a predetermined amount. The imaging direction is controlled based on the detected line-of-sight if the change amount of the detected orientation is larger than the predetermined amount. Thereby the same effect as Embodiment 3 can be acquired.

Embodiments 1 to 4 (including the modifications) are merely examples, and the configurations acquired by appropriately modifying and changing the configurations of Embodiments 1 to 4 within the scope of the spirit of the present invention are included in the present invention. The configurations acquired by appropriately combining the configurations of the Embodiments 1 to 4 are also included in the present invention.

According to the present disclosure, an unintentional change of the observation range can be minimized, and a sensation close to the observation with the naked eye (sensation with no or minimal sense of discomfort) can be provided to the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A display device configured to be used in a state of being fixed to a head of a user, comprising:
   a camera;
   a display configured to display a part of an image captured by the camera as a display range;
   an orientation detection sensor configured to detect an orientation of the display device;
   a line-of-sight detection sensor configured to detect a line-of-sight of the user to the display; and
   a processor configured not to control a position of the display range based on the line-of-sight detected by the line-of-sight detection sensor in a case where a change amount of the orientation detected by the orientation detection sensor is smaller than a predetermined amount, and to control the position of the display range based on the line-of-sight in a case where the change amount of the orientation is larger than the predetermined amount.

2. The display device according to claim 1, wherein in a case where the change amount of the orientation is larger than the predetermined amount, if the line-of-sight changes in an opposite direction of a change direction of the orientation, the processor controls the position of the display range such that a change of a display direction caused by a change of the orientation decreases.

3. The display device according to claim 1, wherein in a case where the change amount of the orientation is larger than the predetermined amount, if the line-of-sight changed in a same direction as a change direction of the orientation, the processor controls the position of the display range such that a change of a display direction caused by a change of the orientation increases.

4. The display device according to claim 1, wherein in a case where the change amount of the orientation is larger than the predetermined amount, the processor controls the position of the display range such that a display direction matches with a direction of the line-of-sight.

5. The display device according to claim 1, wherein a focal distance of the camera is changeable, and in a case where the focal distance is shorter than a predetermined distance, the processor does not control the position of the display range based on a detection result by the orientation detection sensor and a detection result by the line-of-sight detection sensor.

6. The display device according to claim 1, wherein the camera additionally detects an object distance, and the processor additionally controls the position of the display range based on the detected object distance.

7. The display device according to claim 1, wherein the processor additionally controls the position of the display range based on a shaking of the display device.

8. The display device according to claim 1, wherein the display range is moveable in a pan direction and a tilt direction independently.

9. The display device according to claim 8, wherein a control method for moving the display range in the pan direction is different from a control method for moving the display range in the tilt direction.

10. The display device according to claim 1, wherein the display device is a display device which is used while the user fixes the display device to the head of the user, or a display device which is wearable on the head of the user.

11. A control method of a display device including a camera and a display configured to display a part of an image captured by the camera as a display range, the display device being configured to be used in a state of being fixed to a head of a user, the control method comprising:
    an orientation detection step of detecting an orientation of the display device;
    a line-of-sight detection step of detecting a line-of-sight of the user to the display; and
    a control step of not controlling a position of the display range based on the line-of-sight detected in the line-of-sight detection step in a case where a change amount of the orientation detected in the orientation detection step is smaller than a predetermined amount, and controlling the position of the display range based on the line-of-sight in a case where the change amount of the orientation is larger than the predetermined amount.

12. A non-transitory computer readable storage medium that stores a program, wherein the program causes a computer to execute a control method of a display device including a camera and a display configured to display a part of an image captured by the camera as a display range, the display device being configured to be used in a state of being fixed to a head of a user, the control method comprising:
    an orientation detection step of detecting an orientation of the display device;
    a line-of-sight detection step of detecting a line-of-sight of the user to the display; and
    a control step of not controlling a position of the display range based on the line-of-sight detected in the line-of-sight detection step in a case where a change amount of the orientation detected in the orientation detection step is smaller than a predetermined amount, and controlling the position of the display range based on the line-of-sight in a case where the change amount of the orientation is larger than the predetermined amount.

* * * * *